US011499751B2

(12) United States Patent
Houston et al.

(10) Patent No.: US 11,499,751 B2
(45) Date of Patent: Nov. 15, 2022

(54) MULTI-UNIT WATER HEATER FLEXIBLE MOUNTING SYSTEM

(71) Applicant: Rinnai America Corporation, Peachtree City, GA (US)

(72) Inventors: Ansley Houston, Peachtree City, GA (US); Matthew Ryan Dettmering, Newnan, GA (US); Taylor Lamb, Peachtree City, GA (US)

(73) Assignee: Rinnai America Corporation, Peachtree City, GA (US)

( * ) Notice: Subject to any disclaimer, the term of this patent is extended or adjusted under 35 U.S.C. 154(b) by 34 days.

(21) Appl. No.: 16/779,296

(22) Filed: Jan. 31, 2020

(65) Prior Publication Data

US 2021/0239361 A1     Aug. 5, 2021

(51) Int. Cl.
*F24H 9/06* (2006.01)
*F24H 1/10* (2022.01)
*B65D 85/68* (2006.01)

(52) U.S. Cl.
CPC .............. *F24H 9/06* (2013.01); *B65D 85/68* (2013.01); *F24H 1/107* (2013.01)

(58) Field of Classification Search
CPC ........ A47F 5/0853; A47F 5/0876; A47F 5/08; F22B 9/18; F22B 35/008; F22B 37/207; F22B 37/208; F22D 5/36; F24H 9/02; F24H 9/06; F24H 9/1809; F24H 9/1832; F24H 1/32; F24H 1/08; F24H 1/06; F24H 9/0005; B65D 85/68; H02G 3/10; F24B 37/244; F24D 2200/043; F24D 19/0209; F16M 13/02; A47B 95/002; A47B 47/03; A47B 47/0058; A47B 47/027; F24S 25/60

USPC ....... 122/493, 510; 248/220.22, 231.91, 200, 248/309.1, 316.8, 317, 214
See application file for complete search history.

(56) References Cited

U.S. PATENT DOCUMENTS

| 8,936,164 B2 * | 1/2015 | Durney ................. F16B 5/125 |
| 10,234,171 B2 * | 3/2019 | Ando ................... F24H 9/0005 |
| D849,519 S | 5/2019 | Dettmering et al. |

(Continued)

FOREIGN PATENT DOCUMENTS

| JP | S-61197448 U | * 12/1986 | ............... F24H 9/02 |
| JP | S61197448 U | * 12/1986 | ............... F24H 9/02 |

(Continued)

*Primary Examiner* — Edelmira Bosques
*Assistant Examiner* — Brett Peterson Mallon
(74) *Attorney, Agent, or Firm* — Meunier Carlin & Curfman LLC

(57) ABSTRACT

To facilitate a wall-mounted installation of multi-unit water heaters in a location with limited clear wall space, spacer brackets may be installed on the wall to extend a mounting surface away from a plane of the wall. A mounting bracket may be attached to the mounting surface of the spacer brackets. To reduce installation time and costs, a plurality of water heaters may be affixed to a frame prior to installation. A hot water, cold water, and fuel supply manifolds may be coupled to each hot water outlet, cold water inlet, and fuel supply inlet, respectively, of the plurality of water heaters. The mounting bracket comprises a mounting shelf configured to receive the frame, thereby securing the multi-unit water heater system to the wall. The multi-unit water heating system, the spacer brackets, and the mounting bracket may be provided as a kit.

20 Claims, 6 Drawing Sheets

(56) References Cited

U.S. PATENT DOCUMENTS

| | | | | |
|---|---|---|---|---|
| 2010/0133399 A1* | 6/2010 | Zaccolo | ................. | B65F 1/141 |
| | | | | 248/220.21 |
| 2016/0025378 A1* | 1/2016 | Aguilar | .................... | F24H 9/06 |
| | | | | 122/19.2 |
| 2020/0103144 A1 | 4/2020 | Knoblett et al. | | |

FOREIGN PATENT DOCUMENTS

| | | | | | |
|---|---|---|---|---|---|
| JP | 62029184 | U | * | 2/1987 | |
| JP | 62029184 | U | * | 2/1987 | |
| JP | 3660206 | B2 | * | 6/2005 | ......... F24D 19/1051 |
| JP | 2013002786 | A | * | 1/2013 | |
| WO | 2020146746 | A1 | | 7/2020 | |

* cited by examiner

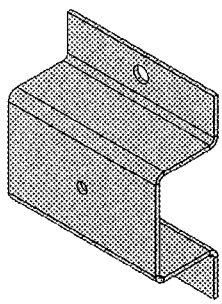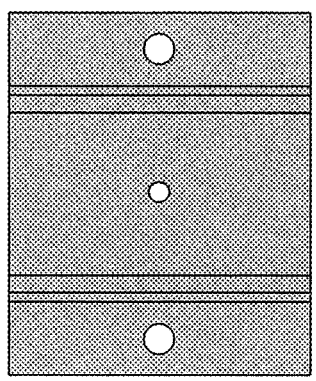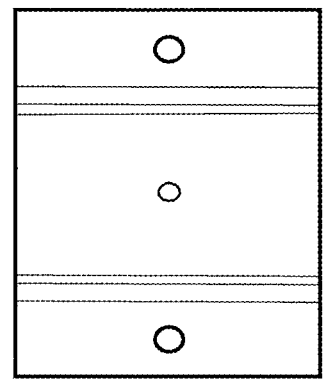
*FIG. 4A*   *FIG. 4B*   *FIG. 4C*
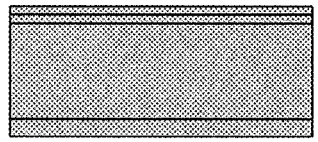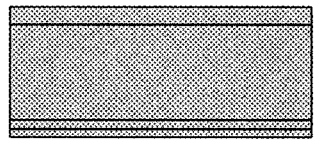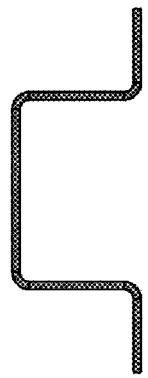
*FIG. 4D*   *FIG. 4E*
*FIG. 4F*
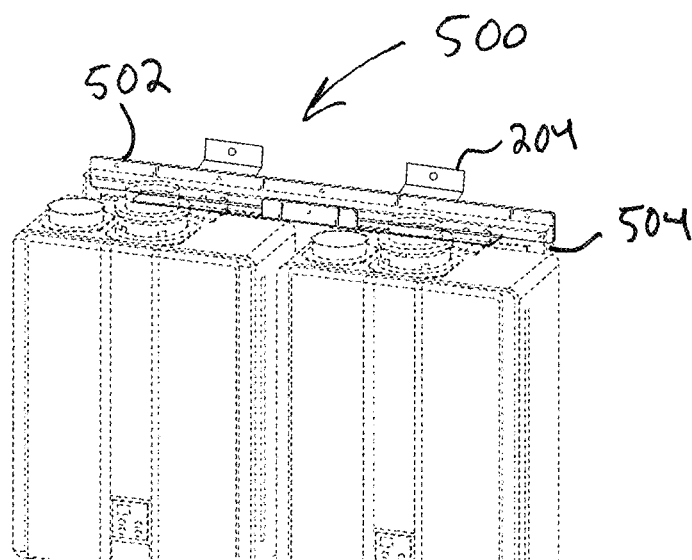
*FIG. 4G*
*FIG. 5*

MULTI-UNIT WATER HEATER FLEXIBLE MOUNTING SYSTEM

BACKGROUND

The need for heated fluids, and heated water, has long been recognized. Conventionally, water has been heated by water heaters containing heating elements. These water heaters are conventionally heated either electrically or with gas burners, where the heated water may be stored in a tank or reservoir. Additionally, such water heaters may be tankless, circulating hot water into a plumbing system without storing the water in a tank or reservoir. Water heaters are often used in private and commercial plumbing networks. Plumbing networks often require water to be continuously circulated into a heater to maintain a desired water temperature in hot-water supply lines.

Many modern businesses, such as Quick Service Restaurants (QSRs) for example, use existing water plumbing networks in limited-space mechanical rooms. The mechanical rooms may also have a large amount of other equipment and conduit which span sections of walls to service the needs of the outlet. Accordingly, there may be limited available clear wall space upon which to install new equipment.

SUMMARY

A first aspect of the disclosure includes a multi-unit water heater system comprising a plurality of water heaters. Each of the water heaters comprises a cold water inlet, a fuel inlet, and a hot water outlet. The multi-unit water heater system comprises a frame, wherein the frame comprises a first support, a second support, and a third support. The first support is arranged parallel to the third support and the second support is affixed to and arranged at an angle to the first and third supports. The plurality of water heaters are affixed to the first and/or third supports. The multi-unit water heater system comprises a cold water manifold comprising a cold water supply inlet fluidically coupled to the cold water inlet of each of the plurality of water heaters. The multi-unit water heater system comprises a hot water manifold comprising a hot water supply outlet fluidically coupled to the hot water outlet of each of the plurality of water heaters. The multi-unit water heater system comprises a fuel manifold comprising a fuel supply inlet fluidically coupled to the fuel inlet of each of the plurality of water heaters.

In some implementations of the first aspect of the disclosure, the second support is affixed the first and the third supports at an intermediate location along a length of the first and the third supports.

In some implementations of the first aspect of the disclosure, the intermediate location is a mid-point of the first and the third supports.

In some implementations of the first aspect of the disclosure, the multi-unit water heater system further comprises a plurality of spacer brackets and a mounting bracket. Each of the plurality of spacer brackets comprises a pair of wall-mount tabs each configured to secure the spacer bracket to a structure, a pair of spacer tabs each configured to extend at an angle from a respective one of the wall-mount tabs, and a mounting surface configured to extend between each of the spacer tabs. The mounting bracket comprises a mounting surface configured to affix to the mounting surface of the plurality of spacer brackets and a mounting shelf sized to receive the first support of the frame.

In some implementations of the first aspect of the disclosure, the mounting shelf extends at an angle from the mounting surface. The mounting bracket further comprises a mounting tab that extends at an angle from the mounting shelf in a direction parallel to the mounting surface of the mounting bracket. The mounting bracket is configured to receive the first support of the frame on the mounting shelf between the mounting tab and the mounting surface of the mounting bracket.

In some implementations of the first aspect of the disclosure, each of the wall-mount tab and the mounting surface of the spacer bracket comprise a hole adapted to receive an attachment member.

In some implementations of the first aspect of the disclosure, the mounting surface of the mounting bracket comprises a slot configured to align with the hole in the mounting surface of the spacer bracket.

In some implementations of the first aspect of the disclosure, the mounting surface of the mounting bracket comprises a frame slot sized and shaped to receive the second support of the frame.

In some implementations of the first aspect of the disclosure, the multi-unit water heater system further comprises a leg assembly. The leg assembly comprises a floor support, a support leg coupled to the floor support at an angle, and a support bracket coupled to the support leg and configured to affix to an end of one of the first or third supports.

In some implementations of the first aspect of the disclosure, the leg assembly further comprises a second support leg coupled at a first end to the support bracket and coupled at a second end to a second support bracket. The second support bracket is configured to affix to an end of the other of the first or third supports.

A second aspect of the disclosure includes a multi-unit water heater mounting kit. The kit comprises a multi-unit water heating system with a plurality of water heaters affixed to a frame. The frame comprises a first support, a second support, and a third support. The first support is arranged parallel to the third support and the second support is affixed to and arranged at an angle to the first and third supports, wherein the plurality of water heaters are affixed to the first and/or third supports. The kit comprises a mounting bracket comprising a mounting surface, a mounting tab, and a mounting shelf that extends between the mounting surface and the mounting tab and is sized to receive the first support of the frame. The kit comprises a plurality of spacer brackets. Each of the plurality of spacer brackets comprises a mounting surface, a pair of spacer tabs, and a pair of wall-mount tabs. The mounting surface of the spacer brackets is adapted to be affixed to the mounting surface of the mounting bracket. The wall-mount tabs are adapted to be affixed to a structure.

In some implementations of the second aspect of the disclosure, each the of the water heaters comprises a cold water inlet, a fuel inlet, and a hot water outlet. The multi-unit water heating system further comprises a cold water manifold comprising a cold water supply inlet fluidically coupled to the cold water inlet of each of the plurality of water heaters, a hot water manifold comprising a hot water supply outlet fluidically coupled to the hot water outlet of each of the plurality of water heaters, and a fuel manifold comprising a fuel supply inlet fluidically coupled to the fuel inlet of each of the plurality of water heaters.

In some implementations of the second aspect of the disclosure, the kit further comprises packaging supports with one or more cut-outs sized to receive the multi-unit water heater system, the mounting bracket, and/or the plurality of spacer brackets.

In some implementations of the second aspect of the disclosure, the kit further comprises primary packaging, wherein the packaging supports are configured to be slidingly received within the primary packaging.

In some implementations of the second aspect of the disclosure, the second support is affixed the first and the third supports at an intermediate location along a length of the first and the third supports.

In some implementations of the second aspect of the disclosure, the intermediate location is a mid-point of the first and the third supports.

In some implementations of the second aspect of the disclosure, each of the wall-mount tab and the mounting surface of the spacer bracket comprise a hole adapted to receive an attachment member.

In some implementations of the second aspect of the disclosure, the mounting surface of the mounting bracket comprises a slot configured to align with the hole in the mounting surface of the spacer bracket.

In some implementations of the second aspect of the disclosure, the mounting surface of the mounting bracket comprises a frame slot sized and shaped to receive the second support of the frame.

In some implementations of the second aspect of the disclosure, the frame slot divides the mounting bracket into a first side and a second side, wherein the slot in the mounting surface of the mounting bracket is on the first side of the mounting bracket, and wherein the mounting surface of the mounting bracket further comprises a second slot on the second side of the mounting bracket.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 4A-4G are various views of the spacer bracket suitable for implementing the several embodiments of the disclosure.

FIG. 5 is a perspective view of another embodiment of a multi-unit water heating system with a mounting bracket and the plurality of spacer brackets.

DETAILED DESCRIPTION

Figure 1A:
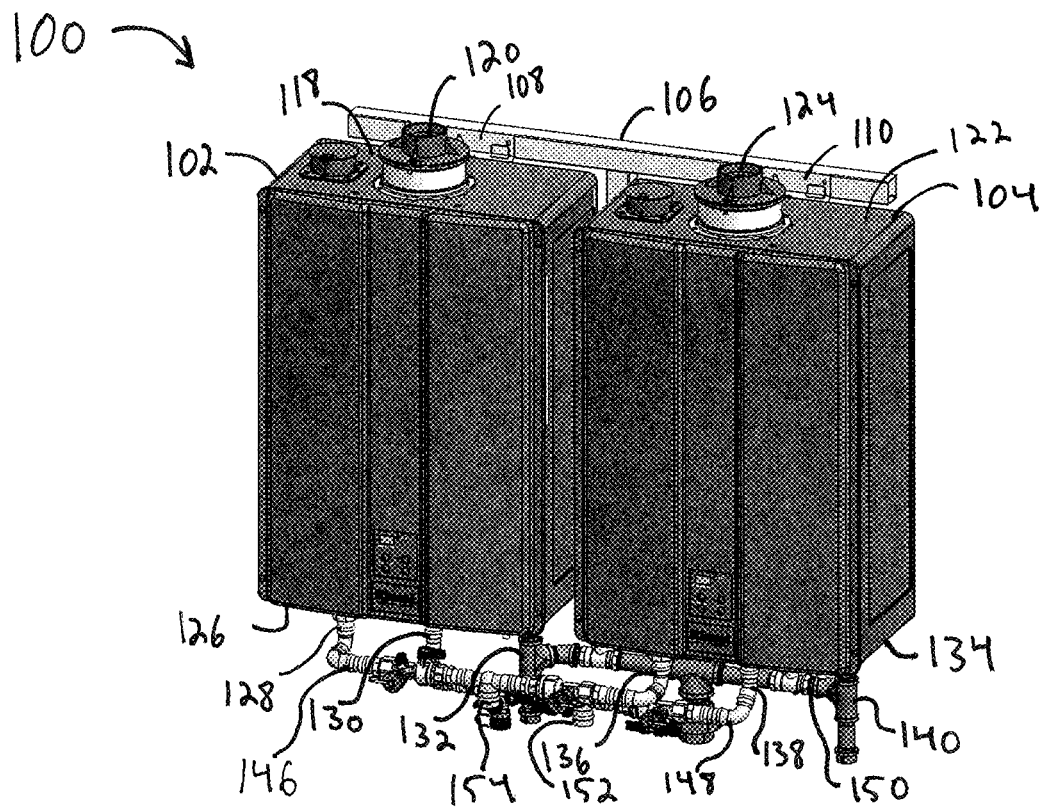
FIGS. 1A-1D are various views of a multi-unit water heating system suitable for implementing the several embodiments of the disclosure.
Figure 1B:
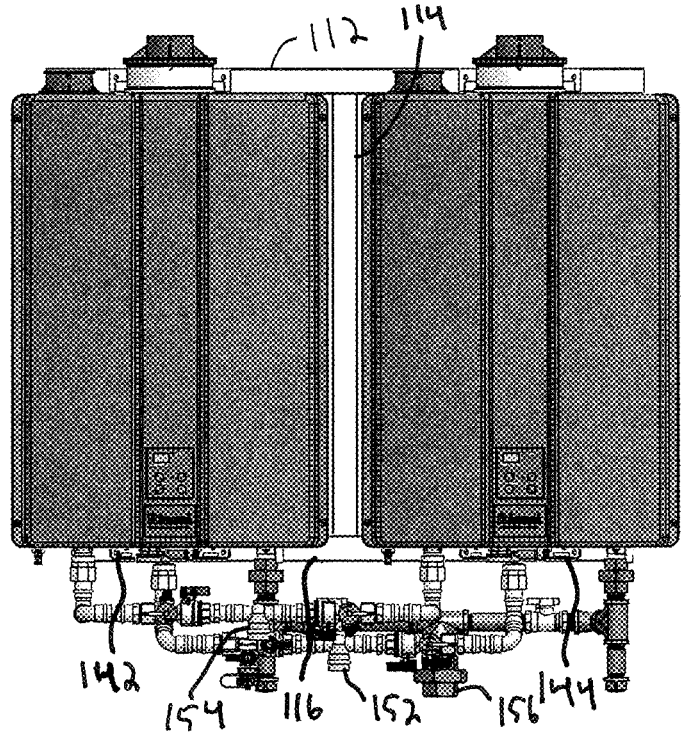

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

To facilitate a wall-mounted installation of one or more tankless water heater units in a location with limited available clear wall space, spacer brackets may be installed on the wall to extend a mounting surface away from a plane of the wall. As such, existing plumbing or conduit may pass behind the spacer brackets such that the tankless water heater unit may be installed without moving or otherwise relocating the existing plumbing or conduit. A mounting bracket may be attached to the mounting surface of the spacer brackets.

In some implementations, to reduce installation time and costs of multi-unit water heater systems, a plurality of water heaters may be affixed to a frame prior to delivery of the system to a building location. Additionally, a hot water, cold water, and fuel supply manifolds may be coupled to each hot water outlet, cold water inlet, and fuel supply inlet, respectively, of the plurality of water heaters. Accordingly, an installer may simply install the spacer brackets to a wall at a desired location and install the mounting bracket to the spacer brackets. The mounting bracket comprises a mounting shelf configured to receive the frame, thereby securing the multi-unit water heater system to the wall. A single connection may then be established between building systems and each of the hot water, cold water, and fuel manifolds to complete installation of the multi-unit water heater system. In some implementations, the multi-unit water heating system, the spacer brackets, and the mounting bracket may be provided as a kit.

FIGS. 1A-1D are various views of a multi-unit water heating system 100 suitable for implementing the several embodiments of the disclosure. The multi-unit water heating system 100 comprises a first water heater 102 and a second water heater 104. The first and second water heaters 102, 104 are affixed to a frame 106. For example, the first water heater 102 is affixed to the frame 106 with a first water heater bracket 108. Likewise, the second water heater 104 is affixed to the frame 106 with a second water heater bracket 110. The first and second water heater brackets 108, 110 are affixed to the frame 106 with a screw, bolt, rivet, weld, or any other suitable component for affixing a bracket to a frame known to those of ordinary skill in the art.

In some implementations, the frame 106 has a first support 112, a second support 114, and a third support 116. The second support 114 is connected at one end to a center or mid-point of the first support 112 and connected at another end to a center or mid-point of the third support 116. In other words, the second support 114 is connected to and bisects each of the first and third supports 114, 116 such that the frame 106 has a generally "I" shaped structure. In some implementations, the frame 106 may have a different structure, such as a square shape, for example. In the example shown, the first and second water heater brackets 108, 110 are affixed to the first support 112 of the frame 106. Accordingly, the first water heater 102 is affixed to the frame 106 such that a first end 118 of the first water heater 102 with an exhaust vent 120, also referred to as a "top" of the first water heater 102, is adjacent to the first support 112, also referred to as a "top" support, of the frame 106. Likewise, the second water heater 104 is affixed to the frame 106 such that a first end 122 of the first water heater 102 with an exhaust vent 124, also referred to as a "top" of the second water heater 104, is adjacent to the top or first support 112 of the frame 106.

A second end 126 of the first water heater 102, also referred to as a "bottom" of the first water heater 102, comprises a hot water outlet 128, a cold water inlet 130, and a fuel inlet 132. Likewise, a second end 134 of the second water heater 104, also referred to as a "bottom" of the second water heater 104, comprises a hot water outlet 136, a cold water inlet 138, and a fuel inlet 140. In the example shown, the fuel inlets 132, 140 are natural gas inlets, though other fuels may be used according to the various embodiments described herein. In some implementations, the first water heater 102 is additionally affixed to the frame 106 with a third water heater bracket 142. Likewise, the second water heater 104 is additionally affixed to the frame 106 with a fourth water heater bracket 144. In the example shown, the third and fourth water heater brackets 142, 144 are affixed to the third support 116 of the frame 106. Accordingly, the first water heater 102 is affixed to the frame 106 such that the bottom or second end 126 of the first water heater 102 is adjacent to the third support 116, also referred to as a "bottom" support, of the frame 106. Likewise, the second water heater 104 is affixed to the frame 106 such that the bottom or second end 134 of the first water heater 102 is adjacent to the bottom or third support 116 of the frame 106.

The multi-unit water heating system 100 also comprises a hot water manifold 146, a cold water manifold 148, and a fuel manifold 150. The hot water manifold 146 couples the hot water outlets 128, 136 with a hot water supply 154. The hot water supply 154 in turn is configured to connect to a plumbing network at a building for supplying hot water produced by the first and second water heaters 102, 104. Likewise, cold water manifold 148 couples the cold water inlets 130, 138 with a cold water supply 152. The cold water supply 152 in turn is configured to connect to a cold water supply in the plumbing network at the building, such as a municipal water supply, for receiving cold water from the plumbing network. The fuel manifold 150 couples the fuel inlets 132, 140 to a fuel supply 156. The fuel supply 156 in turn is configured to connect to a fuel supply in the plumbing network at the building, such as a natural gas supply, for receiving fuel from the plumbing network.

Typically, hot water, cold water, and fuel manifolds for multi-unit water heaters may be arranged in a linearly arranged stack of parallel manifolds that extend away from water heater inlets and outlets (e.g., extending from the bottom 126, 134 of the first or second water heaters 102, 104). For example, following a line that extends away from the bottom 126, 134 of the first or second water heaters 102, 104, some manifolds may be arranged such that a hot water manifold is perpendicular to the line at a first location along the line, a cold water manifold is perpendicular to the line at a second location along the line and arranged parallel to the hot water manifold, and a fuel manifold is perpendicular to the line at a third location along the line and arranged parallel to the hot and cold water manifolds. In this example, the line is parallel to a line between the bottom 126, 134 and the top 118, 122 of the water heaters 102, 104.

However, such linearly arranged stacks of parallel manifolds result in a furthest manifold from the water heater extending a large distance away from the water heaters. For example, the furthest manifold may extend 24 inches or more away from the water heaters. Having manifolds extend along such a distance further exacerbates locating sufficient clear wall space for mounting multi-unit water heating systems. For example, including the height of the water heaters and the manifolds, 48 inches or more of clear vertical wall space may be needed to mount such multi-unit water heater systems to a wall.

In contrast, the manifolds 146, 148, 150 in the example shown in FIGS. 1A-1D are arranged in a tight configuration to minimize a furthest distance from the bottoms 126, 134 of the water heaters 102, 104. For example, the manifolds 146, 148, 150 may be arranged to extend no more than 12 inches away from the water heaters 102, 104.

Figure 1C:
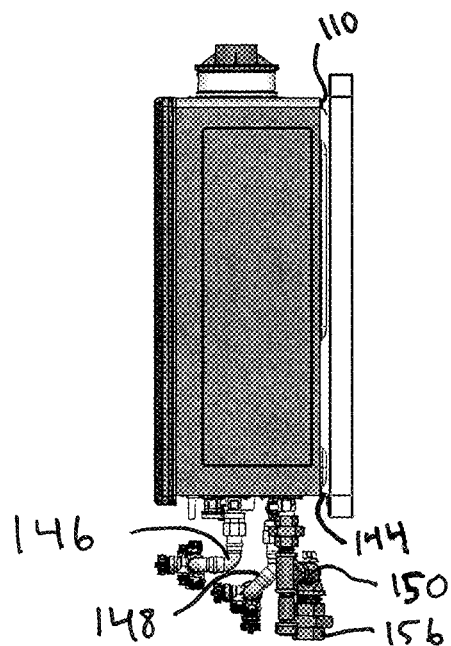
Figure 1D:
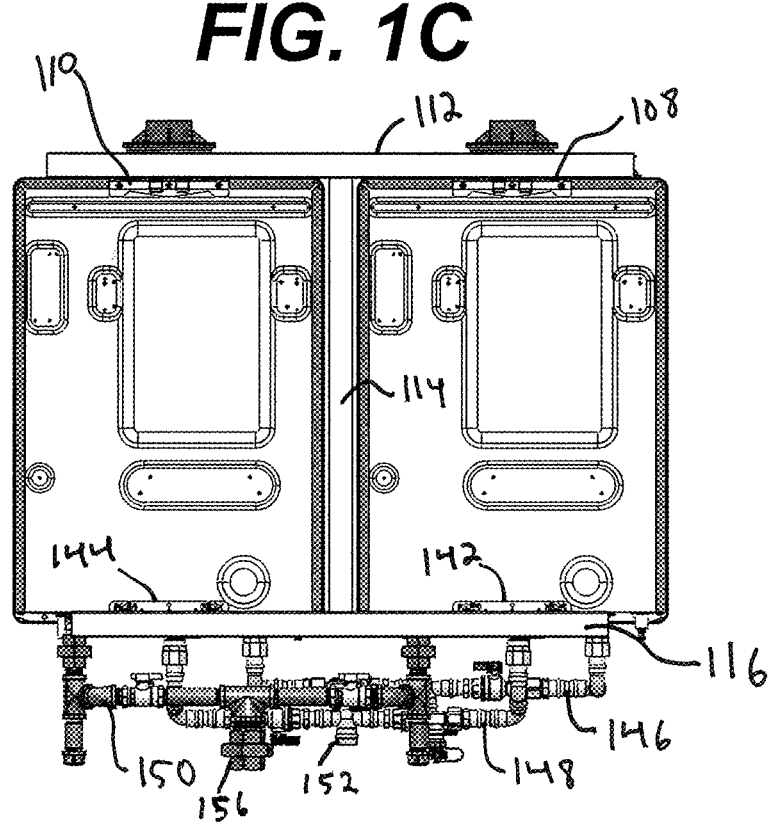

While still extending parallel to each other, the manifolds 146, 148, and 150 are arranged within a three-dimensional space at different distance pairs from the frame 106 and the bottoms 126, 134 of the water heaters 102, 104. In the example shown, a portion of the hot water manifold 146 that is parallel to the other manifolds is at a furthest distance away from the frame 106 and a closest distance to the bottoms 126, 134 of the water heaters 102, 104. A portion of the cold water manifold 148 that is parallel to the other manifolds is at a furthest distance from the bottoms 126, 134 of the water heaters 102, 104 and at an intermediate distance from the frame 106. A portion of the fuel manifold 150 that is parallel to the other manifolds is at a closest distance to the frame 106 and at an intermediate distance from the bottoms 126, 134 of the water heaters 102, 104. As best seen in FIG. 1C, the manifolds 146, 148, 150 are additionally maintained within a footprint or shadow of the multi-unit water heater system 100.

In various implementations, the multi-unit water heating system 100 may be supplied with the water heaters 102, 104 pre-installed on the frame 106 and the manifolds 146, 148, 150, pre-plumbed to the respective inlets and outlets of the water heaters 102, 104. Accordingly, installation of the multi-unit water heating system 100 may be limited to simply physically installing the system 100 in a space (e.g., mounting the system 100 to a wall or installing the system in a floor-standing configuration), and plumbing the manifolds 146, 148, 150 to a plumbing network of an outlet. Therefore, an installer may be saved the time required to install the water heaters 102, 104 to the frame 106 and additionally plumbing the manifolds 146, 148, 150.

Figure 2:
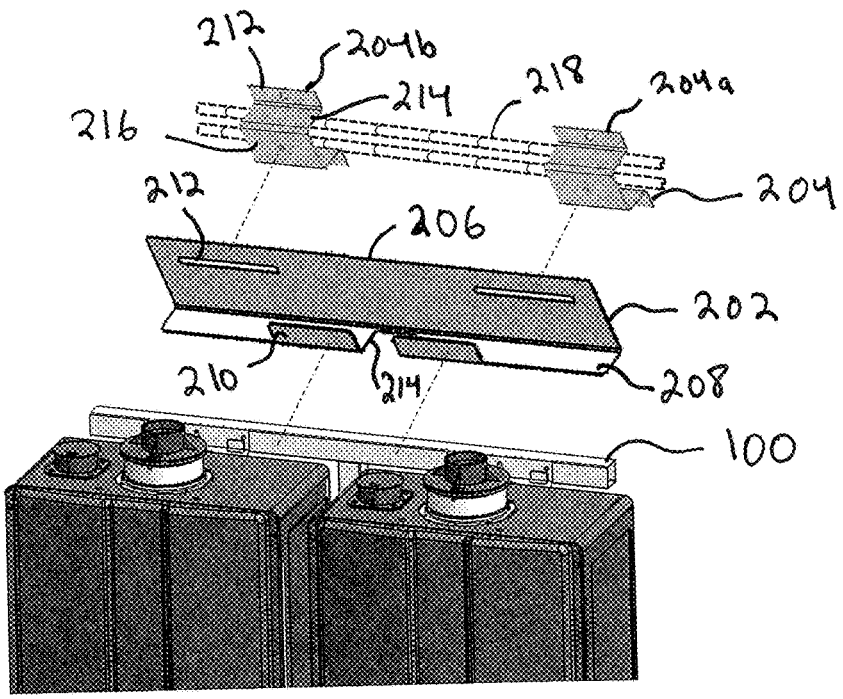
FIG. 2 is an exploded view of the multi-unit water heating system mounted to a wall via a mounting bracket and a plurality of spacer brackets suitable for implementing the several embodiments of the disclosure.

FIG. 2 is an exploded view of the multi-unit water heating system 100 mounted to a wall via a mounting bracket 202 and a plurality of spacer brackets 204 suitable for implementing the several embodiments of the disclosure.

Figure 3A:
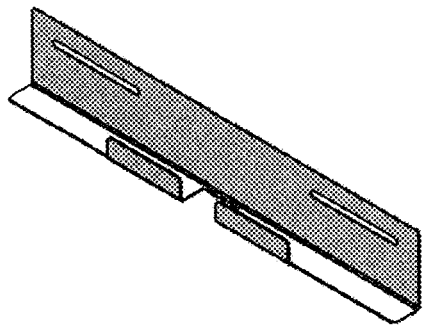
FIGS. 3A-3F are various views of the mounting bracket suitable for implementing the several embodiments of the disclosure.
Figure 3B:
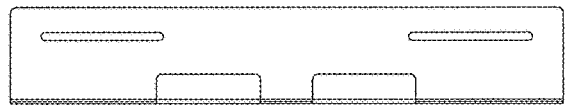
Figure 3C:
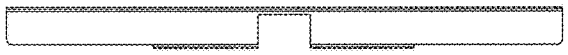
Figure 3D:
Figure 3E:
Figure 3F:

FIG. 3A is a perspective view of the mounting bracket 202. FIG. 3B is a front view of the mounting bracket 202. FIG. 3C is a top view of the mounting bracket 202. FIG. 3D is a right side view of the mounting bracket 202. FIG. 3E is a left side view of the mounting bracket. FIG. 3F is a bottom view of the mounting bracket 202.

FIG. 4A is a perspective view of the spacer bracket 204. FIG. 4B is a front view of the spacer bracket 204. FIG. 4C is a rear view of the spacer bracket 204. FIG. 4D is a top view of the spacer bracket 204. FIG. 4E is a bottom view of the spacer bracket 204. FIG. 4F is a right side view of the spacer bracket 204. FIG. 4G is a left side view of the spacer bracket 204.

Looking back to FIG. 2, the mounting bracket 202 comprises a mounting plane 206, a mounting shelf 208, and mounting tabs 210. The mounting shelf 208 has a frame slot 214 cut out from the mounting shelf 208. The frame slot 214 is sized and shaped to receive the second support 114 of the frame 106. In the example shown, the frame slot 214 is positioned in a middle of the mounting shelf 208 such that the frame slot 214 divides the mounting shelf 208 into two halves, and by extension divides the mounting bracket 202 into two halves. The mounting plane 202 is coupled to the mounting shelf 208 at an angle and has an elongated slot 212 on each half of the mounting bracket 202. In the example shown, the mounting plane 202 is coupled to the mounting shelf 208 at a 90° angle, though other angles between 45°-135° are contemplated by this disclosure. The mounting tabs 210 are coupled to the mounting shelf 208 at an angle and are configured to retain the frame 106 of the multi-unit water heating system 100 on the mounting shelf 208. In the example show, the mounting tabs 210 are coupled to the mounting shelf 208 at a 90° angle, though other angles between 45°-135° are contemplated by this disclosure. The mounting shelf 208 extends from the mounting plane 202 by a distance sufficient to receive the frame 106 between the mounting tabs 210 and the mounting plane 202. In some implementations, the mounting tabs 210 are affixed to the frame 106. For example, the mounting tabs 210 may be screwed, nailed, riveted, glued, or welded to the frame 106 to prevent the frame 106 from sliding along the mounting shelf 208.

The spacer brackets 204 each comprise a pair of wall-mount tabs 212, a pair of spacer tabs 214 that are coupled to and extend from the wall-mount tabs 212 at an angle, and a mounting surface 216 coupled to each of the spacer tabs 214 at an angle. In the example shown, the spacer tabs 214 are coupled to the wall-mount tabs 212 at a 90° angle, though other angles between 45°-135° are contemplated by this disclosure. The spacer tabs 214 extend from the wall-mount tabs 212 by a distance sufficient to allow existing conduit or piping 218 installed along a wall to pass between the mounting surface 216 and the wall. In various implementations, the spacer tabs 214 extend from the wall-mount tabs 212 by a distance between 1-3 inches. In some implementations, the spacer tabs 214 extend from the wall-mount tabs 212 by a distance of two inches. The wall-mount tabs 212 are configured to extend along a surface of the wall by a distance between 1-3 inches. In some implementations, the wall-mount tabs 212 are configured extend along a surface of the wall by 1.5 inches. The mounting surface 216 extends between the spacer tabs 214 by a distance between 2-5 inches. In some implementations, the mounting surface 216 extends between the spacer tabs 214 by a distance of 3 inches. Each of the spacer tabs 214, wall-mount tabs 212, and mounting surface 216 may have a common width dimension between 3-7 inches. In some implementations, the common width dimension is 5 inches. In some implementations, each of the spacer tabs 214, wall-mount tabs 212, and mounting surface 216 have a hole drilled therethrough to facilitate installation of a screw, bolt, rivet, or other attachment member. In various implementations, the hole may be threaded.

When installed, the wall-mount tabs 212 of a plurality of spacer brackets 204 are affixed to a wall at a desired location. In the example shown in FIG. 2, two spacer brackets 204 are used. Other numbers of spacer brackets 204 may be used without departing from the spirit or scope of the disclosure. The mounting bracket 202 is affixed to the plurality of spacer brackets 204. For example, an attachment member, such as a screw or bolt, is inserted through the elongated slot 212 of the mounting bracket 202 and affixed to the mounting surface 216 of a spacer bracket 204. As discussed above, the first support 112 of the frame 106 is placed on the mounting shelf 208 of the mounting bracket 202 with the second support 114 located in the frame slot 214. In some implementations, the mounting tabs 210 are affixed to the frame as well.

While the example shown in FIG. 2 shows the installation of the first support 112 of the frame 106 with the mounting bracket 202, one or more spacer brackets or a combination of spacer brackets and a second mounting bracket (not shown) may be used to mount the third support 116 to the wall. In one implementation, one or more spacer brackets may be installed on the wall at a location along a length of the third support 116, such that the multi-unit water heating system 100 is cantilevered against the additional one or more spacer brackets. In some implementations, a single space bracket is installed on the wall at a location proximate to the intersection of the third support 116 with the second support 114. In some implementations, the additional one or more spacer brackets may be affixed to the third support 116 by a screw, bolt, glue, welding, or other suitable component for affixing spacer brackets to the third support 116. In some implementations, a second mounting bracket may be installed on the additional one or more spacer brackets and the third support 116 is mounted on a mounting surface of the second mounting bracket. Other variations are contemplated by this disclosure.

While the frame 106 has a generally "I" shaped structure in the examples described above, other frame structures and geometries are contemplated. For example, FIG. 5 shows a perspective view of another embodiment of a multi-unit water heating system 500 with a mounting bracket 502 and the plurality of spacer brackets 204. As shown, a square frame 502 of the multi-unit water heating system 500 is installed on the mounting bracket 502. In various implementations, the mounting bracket 502 may be the bracket shown and described in U.S. Design patent application Ser. No. 29/686,899, "Bracket", filed on Apr. 9, 2019 or the bracket shown and described in U.S. Pat. No. D849,519, "Bracket", filed on May 2, 2016, the disclosures of which are hereby incorporated by reference in their entirety.

Figure 6A:
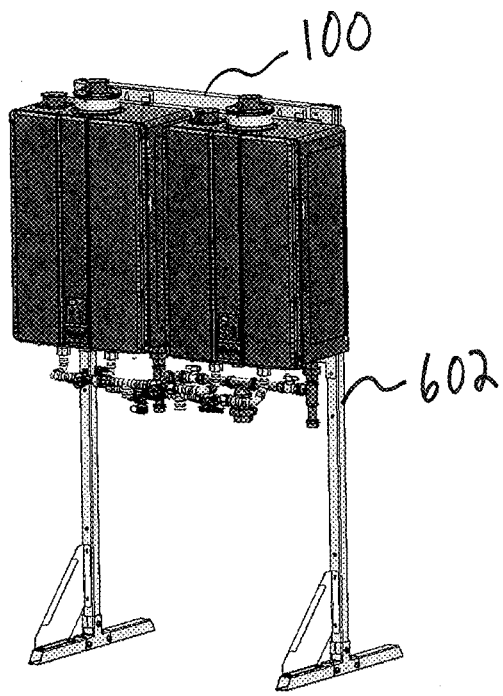
FIGS. 6A-6B are various views of the multi-unit water heater system mounted to leg assemblies suitable for implementing the several embodiments of the disclosure.
Figure 6B:
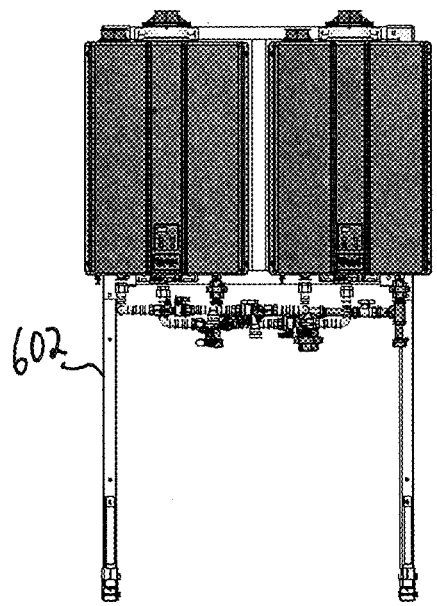
Figure 7:
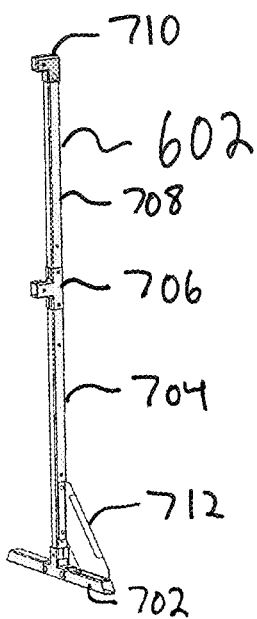
FIG. 7 is a perspective view of a leg assembly suitable for implementing the several embodiments of the disclosure.

FIGS. 6A-6B are various views of the multi-unit water heater system 100 mounted to leg assemblies 602 suitable for implementing the several embodiments of the disclosure. FIG. 7 is a perspective view of a leg assembly 602 suitable for implementing the several embodiments of the disclosure. As shown, the leg assembly 602 is affixed to an end of the first support 112 and/or the third support 116 of the frame 106. In the example shown, two leg assemblies 602 are used, one attached on each end of the first support 112 and/or the third support 116 of the frame 106. Accordingly, the leg assemblies 602 support the multi-unit water heater system 100 for a floor-standing installation when no suitable wall space is available at an installation location or a floor-standing installation is otherwise preferred.

As shown in FIG. 7, the leg assembly 602 comprises a floor support 702, a first leg 704, a first support bracket 706, a second support leg 708, and a second support bracket 710. The floor support 702 is affixed to the first leg 704 at an angle and is configured to support the first leg 704 on a floor or other substrate. For example, the first leg 704 is affixed to the floor support 702 at a mid-point of the floor support 702 at a 90° angle. In some implementations, a brace 712 may also be coupled between an intermediate location along the first leg 704 and a location on the floor support 702 other than where the first leg 704 is affixed to the floor support. In various implementations, the location where the brace 712 is affixed to the floor support 702 includes a location proximate to an end of the floor support 702.

Each of the first support bracket 706 and the second support bracket 710 are configured to affix the leg assembly 602 to the frame 106. Specifically, the first support bracket 706 is configured to affix to an end of the third support 116 of the frame 106. In some implementations, the first support bracket 706 is sized and shaped to receive an end of the third support 116. The first support bracket 706 may be affixed to the third support 116 with a screw, bolt, rivet, glue, weld, or any other suitable component for affixing a bracket to a frame known to those of ordinary skill in the art. Likewise, the second support bracket 710 is sized and shaped to receive an end of the first support 112. The second support bracket 710 may be affixed to the first support 112 with a screw, bolt, rivet, glue, weld, or any other suitable component for affixing a bracket to a frame known to those of ordinary skill in the art. A second leg assembly 602 may similarly be affixed to the other end of the first and third supports 112, 116.

The "I" shaped structure of the frame 106 provides flexibility for both wall-mounting (e.g., FIG. 2) or floor-installing (e.g., FIGS. 6A-6B) the multi-unit water heating system 100 while at the same time minimizing the amount of material used for the construction of the frame 106. For example, in comparison to a square shaped frame, the "I" shaped structure of the frame 106 has only one length of material (e.g., second support 114) that connect the first support 112 to the third support 116, as opposed to the two lengths of material that would be used for a square frame.

Figure 8A:
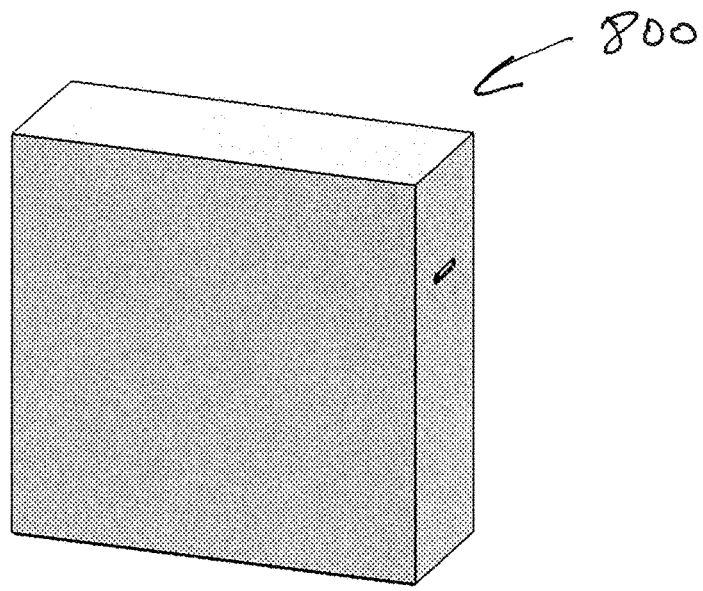
FIGS. 8A-8B are a closed and open view of a multi-unit water heating system kit suitable for implementing the several embodiments of the disclosure.
Figure 8B:
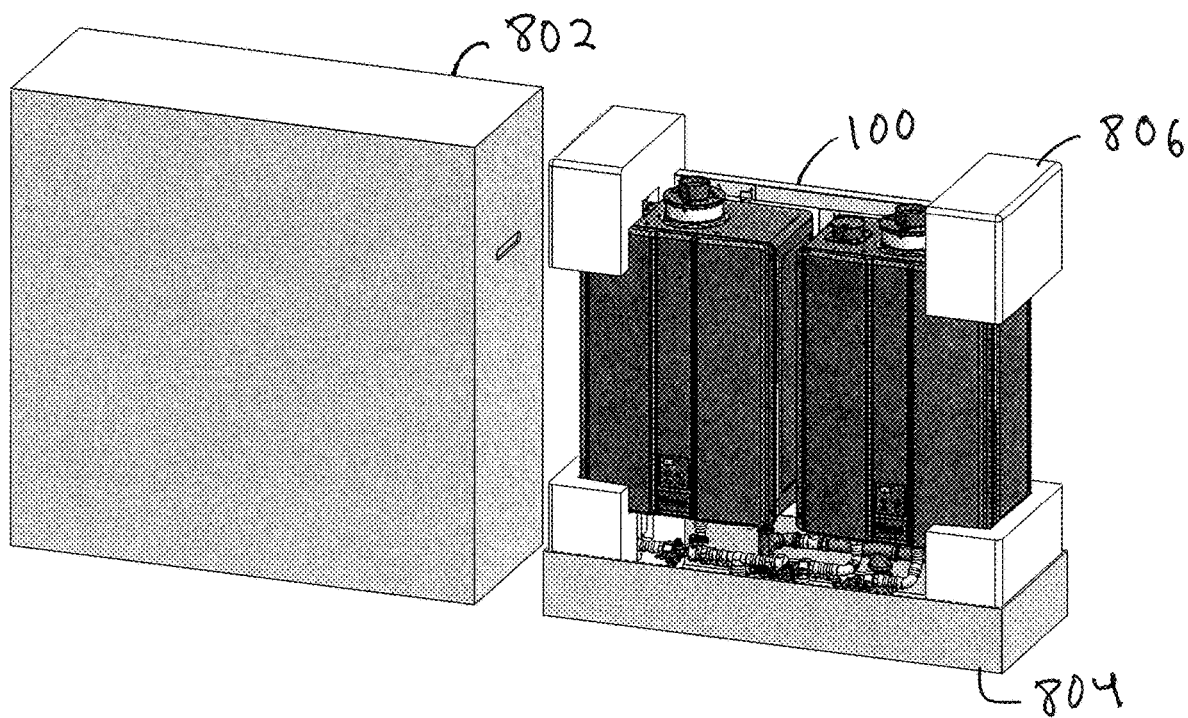

FIGS. 8A-8B are a closed and open view of a multi-unit water heating system kit 800 suitable for implementing the several embodiments of the disclosure. The kit 800 includes a primary packaging cover 802 and a primary packaging base 804. As shown, the primary packaging cover 802 is configured to slidingly fit over the primary packaging base 804. The primary packaging cover 802 and primary packaging base 804 may be made of any suitable packaging material such as paperboard, wood, metal, or the like. Secondary packaging supports 806 are configured to slidingly fit within the primary packaging base 804 and support the multi-unit water heating system 100. For example, one of the secondary packaging supports 806 may be affixed to each corner of the multi-unit water heating system 100. Each of the secondary packaging supports 806 include cut-outs with a shape corresponding to the shape of the water heaters 102, 104 and frame 106. The secondary packaging supports 806 positioned within the primary packaging base 804 additionally include cut-outs for one or more of the manifolds 146, 148, 150. Additionally, the kit 800 includes the mounting bracket 202 and a plurality of the spacer brackets 204. For example, 3-4 of the spacer brackets 204 may be provided in the kit 800. In various implementations, the secondary packaging supports 806 may additionally include cut-outs (not shown) for supporting the mounting bracket 202 and the plurality of the spacer brackets 204. For example, a cut-out on the top secondary packaging supports 806 may facilitate the mounting bracket 202 to nest within the secondary packaging supports 806 along a length of the kit 800. Additionally, a cut-out sized and shaped according to one of the side views of the spacer brackets 204 shown in FIGS. 4F-4G may be cut into each of the secondary packaging supports 806 for accommodating the plurality of the spacer brackets 204 in the kit 800. In some implementations, a second kit (not shown) may provide a disassembled leg assemblies 602.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A multi-unit water heater system, comprising:
   a plurality of water heaters, wherein each of the plurality of water heaters comprises a body with a front cover, a cold water inlet, a fuel inlet, a hot water outlet, and one or more water heater mounting brackets;
   a mounting frame, wherein the mounting frame comprises a first support, a second support, and a third support, wherein the first support is arranged parallel to the third support and the second support is affixed to and arranged at an angle to the first and third supports, wherein each of the plurality of water heaters are affixed to the first and/or third supports of the mounting frame via the one or more water heater mounting brackets, wherein the mounting frame is a separate structure that is external to the plurality of water heaters;
   a mounting bracket, wherein the mounting bracket comprises a mounting surface configured to affix the mounting bracket to a support surface, wherein the mounting bracket further comprises a mounting shelf sized to receive the first support of the mounting frame, wherein the mounting bracket is a separate structure that is external to the plurality of water heaters and the mounting frame;
   a cold water manifold comprising a cold water supply inlet fluidically coupled to the cold water inlet of each of the plurality of water heaters;
   a hot water manifold comprising a hot water supply outlet fluidically coupled to the hot water outlet of each of the plurality of water heaters; and
   a fuel manifold comprising a fuel supply inlet fluidically coupled to the fuel inlet of each of the plurality of water heaters,
   wherein the plurality of water heaters is affixed to the first and/or third supports such that the cold water inlet, the fuel inlet, and the hot water outlet are spaced apart from the first and/or third supports in a direction perpendicular to a plane that extends between the first and third supports.

2. The system of claim 1, wherein the second support is affixed the first and the third supports at an intermediate location along a length of the first and the third supports.

3. The system of claim 2, wherein the intermediate location is a mid-point of the first and the third supports.

4. The system of claim 3, further comprising:
   a leg assembly comprising a floor support, a support leg coupled to the floor support at an angle, and a support bracket coupled to the support leg and configured to affix to an end of one of the first or third supports.

5. The system of claim 4, wherein the leg assembly further comprises a second support leg coupled at a first end to the support bracket and coupled at a second end to a second support bracket, wherein the second support bracket is configured to affix to an end of the other of the first or third supports.

6. The system of claim 2, further comprising:
a plurality of spacer brackets, wherein each of the plurality of spacer brackets comprises a pair of wall-mount tabs each configured to secure the spacer bracket to a structure, a pair of spacer tabs each configured to extend at an angle from a respective one of the wall-mount tabs, and a mounting surface configured to extend between each of the spacer tabs; and
wherein the mounting surface of the mounting bracket is configured to affix to the mounting surface of the plurality of spacer brackets.

7. The system of claim 6, wherein the mounting shelf extends at an angle from the mounting surface of the mounting bracket, wherein the mounting bracket further comprises a mounting tab that extends at an angle from the mounting shelf in a direction parallel to the mounting surface of the mounting bracket, and wherein the mounting bracket is configured to receive the first support of the mounting frame on the mounting shelf between the mounting tab and the mounting surface of the mounting bracket.

8. The system of claim 6, wherein each of the wall-mount tab and the mounting surface of the spacer bracket comprise a hole adapted to receive an attachment member.

9. The system of claim 8, wherein the mounting surface of the mounting bracket comprises a slot configured to align with the hole in the mounting surface of the spacer bracket.

10. The system of claim 6, wherein the mounting surface of the mounting bracket comprises a frame slot sized and shaped to receive the second support of the mounting frame.

11. A multi-unit water heater mounting kit, comprising:
a multi-unit water heating system with a plurality of water heaters affixed to a mounting frame, wherein each of the plurality of water heaters comprises a body with a front cover, wherein the mounting frame is a separate structure that is external to the plurality of water heaters, wherein the mounting frame comprises a first support, a second support, and a third support, wherein the first support is arranged parallel to the third support and the second support is affixed to and arranged at an angle to the first and third supports, wherein each of the plurality of water heaters are affixed to the first and/or third supports of the mounting frame via one or more water heater mounting brackets;
a mounting bracket comprising a mounting surface, a mounting tab, and a mounting shelf that extends between the mounting surface and the mounting tab and is sized to receive the first support of the mounting frame, wherein the mounting bracket is a separate structure that is external to the plurality of water heaters and the mounting frame; and
a plurality of spacer brackets, each of the plurality of spacer brackets comprises a mounting surface, a pair of spacer tabs, and a pair of wall-mount tabs, wherein the mounting surface of the spacer brackets is adapted to be affixed to the mounting surface of the mounting bracket, and wherein the wall-mount tabs are adapted to be affixed to a structure,
wherein the plurality of water heaters is affixed to the first and/or third supports such that at least a portion of at least one of the plurality of water heaters is spaced apart from the first and/or third supports in a direction perpendicular to a plane that extends between the first and third supports.

12. The kit of claim 11, wherein each the of the plurality of water heaters comprises a cold water inlet, a fuel inlet, and a hot water outlet, and wherein the multi-unit water heating system further comprises a cold water manifold comprising a cold water supply inlet fluidically coupled to the cold water inlet of each of the plurality of water heaters, a hot water manifold comprising a hot water supply outlet fluidically coupled to the hot water outlet of each of the plurality of water heaters, and a fuel manifold comprising a fuel supply inlet fluidically coupled to the fuel inlet of each of the plurality of water heaters.

13. The kit of claim 12, further comprising:
packaging supports with one or more cut-outs sized to receive the multi-unit water heater system, the mounting bracket, and/or the plurality of spacer brackets.

14. The kit of claim 13, further comprising:
primary packaging, wherein the packaging supports are configured to be slidingly received within the primary packaging.

15. The kit of claim 11, wherein the second support is affixed the first and the third supports at an intermediate location along a length of the first and the third supports.

16. The kit of claim 15, wherein the intermediate location is a mid-point of the first and the third supports.

17. The kit of claim 11, wherein each of the wall-mount tab and the mounting surface of the spacer bracket comprise a hole adapted to receive an attachment member.

18. The kit of claim 17, wherein the mounting surface of the mounting bracket comprises a slot configured to align with the hole in the mounting surface of the spacer bracket.

19. The kit of claim 18, wherein the mounting surface of the mounting bracket comprises a frame slot sized and shaped to receive the second support of the mounting frame.

20. The kit of claim 19, wherein the frame slot divides the mounting bracket into a first side and a second side, wherein the slot in the mounting surface of the mounting bracket is on the first side of the mounting bracket, and wherein the mounting surface of the mounting bracket further comprises a second slot on the second side of the mounting bracket.

* * * * *